United States Patent [19]
Desai et al.

[11] Patent Number: 5,302,110
[45] Date of Patent: Apr. 12, 1994

[54] UNITIZED BATTERY PACKAGE

[75] Inventors: Venus D. Desai; Robert D. Kreisinger, both of Plantation; Russell E. Gyenes, Sunrise, all of Fla.

[73] Assignee: Motorola, Inc., Schaumburg, Ill.

[21] Appl. No.: 33,936

[22] Filed: Mar. 19, 1993

[51] Int. Cl.[5] .............................. H01M 2/10
[52] U.S. Cl. ........................ 429/96; 429/159
[58] Field of Search ............. 429/159, 157, 163, 164, 429/96, 100, 99, 177, 4, 185, 123

[56] References Cited

U.S. PATENT DOCUMENTS

| | | | |
|---|---|---|---|
| 3,794,525 | 2/1974 | Kaye | 429/159 X |
| 3,887,394 | 6/1975 | Kaye | 429/159 X |
| 4,091,187 | 5/1978 | Kaye | 429/159 |
| 4,123,598 | 10/1978 | Hammel | 429/99 X |
| 4,190,702 | 2/1980 | Pun et al. | 429/4 |
| 4,965,148 | 10/1990 | Daio et al. | 429/159 |
| 5,149,602 | 9/1992 | Savovic et al. | 429/96 |

OTHER PUBLICATIONS

Theory of Spread-Spectrum Communication by Raymond L. Pickholtz, Donald L. Schilling, and Laurence B. Milstein, published in IEEE Transaction on Communication, vol. Com-30, No. 5, May 1982.
Crosscorrelation Properties of Pseudorandom and Related Sequences, by Dilip V. Sarwate and Michael B. Pursley, published in Proceedings of the IEEE, vol. 68, No. 5, May 1980.

Primary Examiner—Anthony Skapars
Attorney, Agent, or Firm—Dale W. Dorinski

[57] ABSTRACT

An electrical energy source (5), comprises a power supply (14) located in a housing (16). The power supply has positive (22) and negative (24) terminals attached to it and to the exterior of the housing. Conductors (12) connect the power supply to the positive and negative terminals. The housing has one or more apertures (20) in it that correspond to the location of the power supply. A non-conductive film (36) having an adhesive portion (24) is adhesively bonded to both the power supply and the cover. The power supply can be one or more battery cells (10), and the housing typically consists of a top (18) and a bottom (20), each of which have openings that correspond to the battery cells. The cells are co-located with the openings so that the cylindrical wall (32) of the battery cell is tangent to the exterior (33) of the housing.

15 Claims, 3 Drawing Sheets

UNITIZED BATTERY PACKAGE

CROSS REFERENCE TO RELATED APPLICATIONS

This application is related to U.S. patent application Ser. No. 08/033,524, filed Mar. 19, 1993, entitled "Method of Bonding a Battery Package" by Venus D. Desai and Robert D. Kreisinger, filed concurrently herewith, and assigned to Motorola, Inc.

TECHNICAL FIELD

This invention relates in general to electrical energy sources and more particularly to a battery package.

BACKGROUND

Portable electronic devices, such as two-way radios, typically use an energy source, for example a battery, to derive power necessary for operation. A battery can comprise a single battery cell or a plurality of battery cells arranged in various fashion, for example, in series, parallel, or a combination of series and parallel.

When an electronic device, such as a radio, is subjected to shock or vibration, for example when dropped, any movement of the battery cells created by the impact of the drop can cause a momentary loss of power and result in unpredictable operation of the radio. During the drop, a physical connection of one battery cell to another (or to the radio) can become momentarily broken or opened, causing a dysfunction or total loss of power to the device. An important point which must be considered in the case of some portable communication devices, such as radios, is the mass of the energy source is a large proportion of the total mass of the device. This creates problems in the design of a system to effectively retain the battery cells in a consistent position during operation in all possible orientations and modes.

Battery cells are typically cylindrically- or rectangularly-shaped and include positive and negative electrical contact surfaces at their ends. Consequently, the battery cell is generally located in a cylindrical or rectangular chamber formed within a battery housing. Typically, the inter-cell connections are provided by welding metal tabs between the cells.

In order to make an energy source having the highest energy density in the smallest package, all of the interior volume of the housing should be filled with the battery cells. This has led to the development of prismatic or rectangular battery cells that efficiently fill cubic- or square-shaped housings. However, these cells are rather expensive and not readily available on the mass consumer market. Typically, cylindrical battery cells are used and a significant portion of the housing interior volume is wasted due to the attempt of placing round cells in a square housing. However, this loss of energy density or efficiency is typically offset by the lower cost of the cylindrical cells versus the prismatic cells. When using cylindrical cells, special techniques must be used to maintain the cells in position during drop, requiring even more space in the housing. These positioning devices reduce the overall volume utilization of the package, degrading the efficiency and increasing the package size.

In the prior art, the battery cells are typically held in place and kept from moving by dispensing a bead of hot-melt adhesive in the channel in between the neighboring cells. This method of dispensing hot-melt is messy and slow and results in an inconsistent battery package which does not provide the high degree of reliability desired.

Clearly, what is needed is a method of providing a high-efficiency, high-energy density package at a low cost.

SUMMARY OF THE INVENTION

Briefly, according to the invention, there is provided an electrical energy source, comprising a power supply located in a housing. The power supply has positive and negative terminals attached to it and to the exterior of the housing. Conductors connect the power supply to the positive and negative terminals. The housing cover has one or more apertures in it that correspond to the location of the power supply. A non-conductive film having an adhesive portion is adhesively bonded to both the power supply and the cover.

In another embodiment of the invention, the power supply is one or more battery cells, and the housing consists of a top and a bottom, each of which have openings that correspond to the battery cells. The cells are co-located with the openings so that the cylindrical wall of the battery cell is tangent to the exterior of the housing.

DETAILED DESCRIPTION OF THE PREFERRED EMBODIMENT

Figure 1:
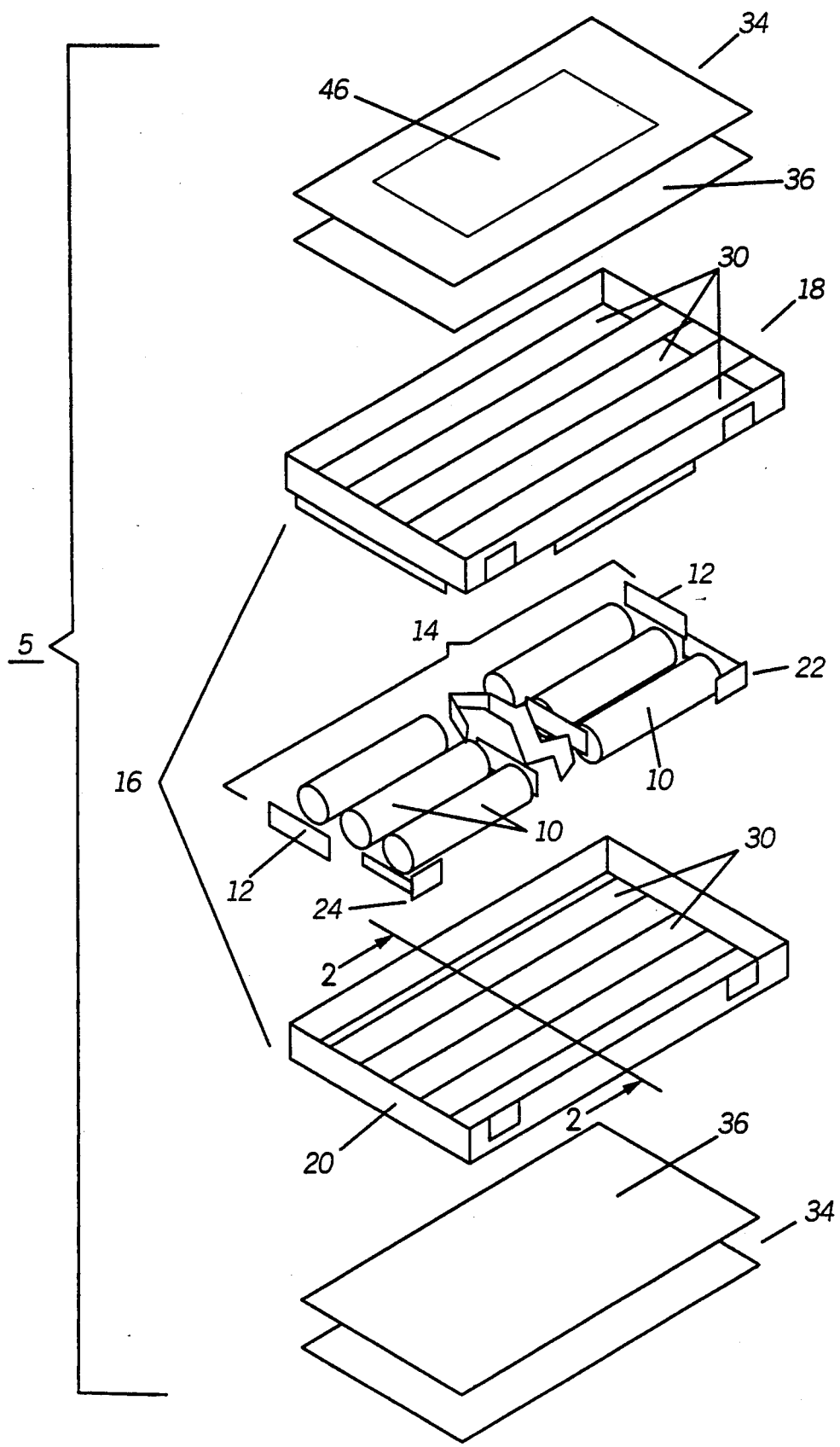
FIG. 1 is an exploded isometric view of a battery package in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, an electrical energy source or battery package 5 typically consists of a number of batteries or battery cells 10. As used herein, the terms battery, battery cell and cell are interchangeable and refer to the individual electrochemical unit, whereas the assembled group of batteries or battery cells is referred to as a battery package. The batteries 10 are interconnected by a conductor means 12 which typically consists of a series of metal tabs welded so that the positive terminal of one cell is interconnected with the negative terminal of another cell. Each of the cells is so interconnected to create a continuous electrical circuit, thereby creating a power supply means 14. Power supply means 14 may also have other parts incorporated therein, such as resistors, thermistors, diodes, LEDs and other circuitry. Other means of energy storage, such as large capacitors, pseudocapacitors, or ultracapacitors may be substituted for or added to the battery cells 10 in order to form a power supply means 14. The cover 34 and the adhesive layer 36 are shown in exaggerated thickness in order to provide the clarity and detail needed to clearly illustrate the invention.

In order to contain the power supply means 14, a housing 16 is formed around the power supply. The housing 16 typically consists of a top portion 18 and a bottom portion 20. Positive terminal 22 and negative terminal 24 provide electrical contact to the exterior of the battery package 5. A first portion of each terminal is interconnected to the conductor means 12, and a second portion of each terminal is formed so as to reside on the exterior surface of the housing 16.

In order to provide a package having the minimum thickness and maximum utilization of the space on the interior of the package, a series of apertures or openings 30 are provided in the top and/or bottom of the housing. Depending upon the degree of efficiency desired, the apertures 30 may be formed in both halves of the housing or simply in one half.

Figure 2:
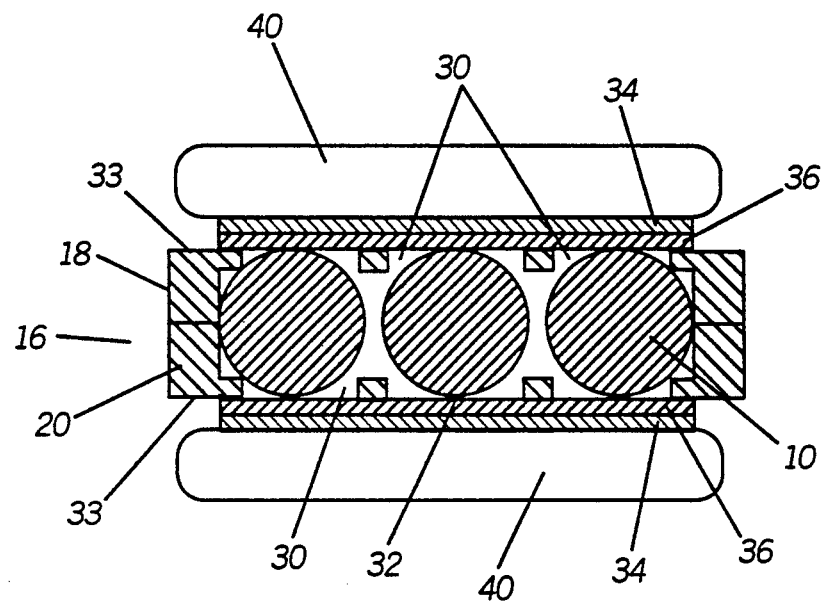
FIG. 2 is a cross-sectional view through section 2—2 of FIG. 1, prior to final assembly.
Figure 3:
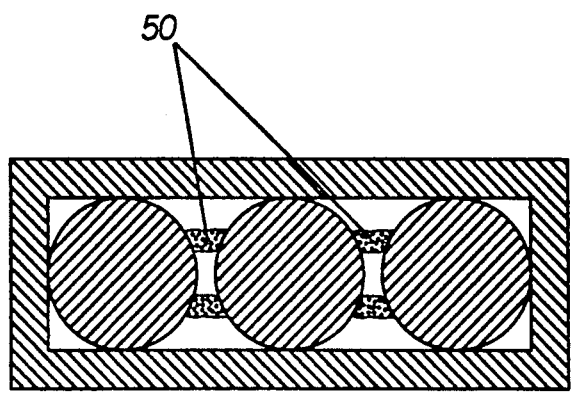
FIG. 3 is a cross-sectional view of a prior art battery package.

Referring now to FIG. 2, a cross-sectional view through section 2—2 of FIG. 1, it can be seen that the battery cells 10 are situated in the housing 16 such that the cylindrical-shaped battery is co-located with the apertures 30 in the housing top 18 and bottom 20. This results in the cylindrical walls of the battery cell 10 being substantially tangent to the exterior surfaces 33 of the housing. The openings 30 allow the housing to be made substantially smaller than would normally be the case by eliminating the need for a substantial wall thickness at the point of tangency between the battery and the housing. In the prior art, as shown in FIG. 3, the overall thickness of the housing is substantially thicker because of the need to provide a finite wall thickness at the tangent point between cell and housing.

In order to retain the battery cells 10 in position, to provide for environmental protection of the battery cells, and add further structure to the completed package, a cover 34 is placed over the top and/or bottom in order to cover the apertures 30, as shown in FIG. 2. The cover 34 is affixed to the housing 16 and to the cells 10 using an adhesive 36. The adhesive 36 may be a continuous film, a series of strips, or a mesh in such form as desired by the designer; however, the adhesive should be a material that can be melted and/or cured, and should be configured in such a manner as to affix the cell and housing to the adhesive. Typical adhesives are hot-melt, a pressure-sensitive adhesive such as an acrylic material, or an epoxy. In the preferred embodiment of the invention, the adhesive 36 is a film of pressure-sensitive acrylic adhesive and the cover 34 is a polyester film such as MYLAR ®.

FIG. 2 shows the assembled battery package 5 prior to the final assembly step. Note that the batteries are located within the housing such that the individual battery cells are co-located with the apertures 30 in the top and bottom, and that the cylinder walls 32 of the batteries are substantially tangent to an exterior surface 33 of the housing. The cover 34 and the adhesive film 36 are in place and ready to be bonded to both the housing and the cells. The assembly is then placed into an ultrasonic welding apparatus such that ultrasonic horns 40 are in contact with the assembly. When the ultrasonic horns 40 are energized, heat is generated at the surfaces, causing the top 18 to be welded to the bottom 20 and also causing the adhesive 36 to soften and deform.

Figure 4:
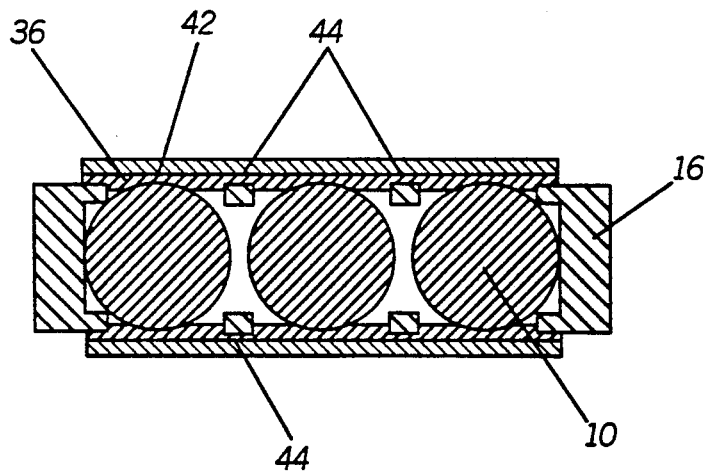
FIG. 4 is a cross-sectional view through section 2—2 of FIG. 1 after assembly.

As can be seen in FIG. 4, a first portion 42 of the adhesive becomes thinner and is bonded to the battery cell 10 and a second portion 44 of the adhesive is also deformed but is bonded to the housing top and/or bottom. The ability to locally deform the adhesive 36 by means of ultrasonic energy provides a significant enhancement in reducing the overall size of the battery package. Note that the housing 16 is now a unitized package and that the joint or disjuncture between the top and bottom halves is no longer present because the two halves have been ultrasonically welded.

Figure 5:
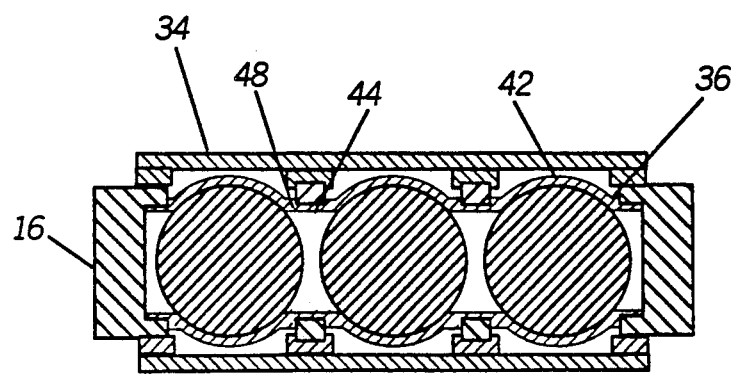
FIG. 5 is a cross-sectional view of another embodiment of the invention, through section 2—2 of FIG. 1.

Referring now to FIG. 5, another embodiment of the invention, it can be seen that the adhesive 36 can also be placed on the interior of the housing, forming another type of bond between the battery cells 10 and the housing top and/or bottom halves 18 and 20. In this case, the adhesive is bonded to an interior surface 48 of the housing 16. As in the case shown in FIG. 4, a unitized package is created because the adhesive material bonds to both the battery cells and the housing. Note also that the first and second portions (42 and 44) of the adhesive are deformed and are thinner sections after ultrasonic welding. It should be clear to the reader that ultrasonic energy provides a means of locally heating and melting or deforming the adhesive at the desired spots, which could not be obtained in any other manner. For example, conventional heating with a hot platen would not properly melt the adhesive, and the assembly cannot be placed in an oven because the battery cells cannot typically be subjected to temperatures in excess of 65° C. for any substantial period of time. Use of ultrasonic welding and ultrasonic energy allows materials of much higher melting points to be used, for example, melting points that are higher than the normal service temperature of the batteries. It should also be noted that the ultrasonic horn does not directly contact the parts being melted, for example, the adhesive 36, but is indirect contact and the energy is transmitted through the cover 34.

Figure 6:
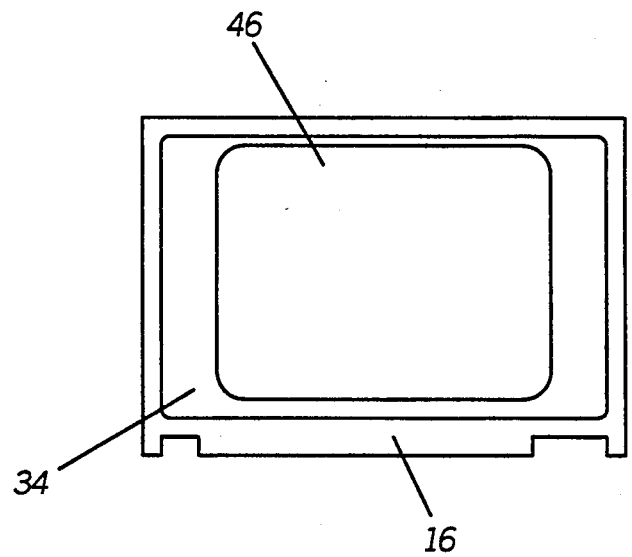
FIG. 6 is a top plan view of a battery package in accordance with the invention.
Figure 7:
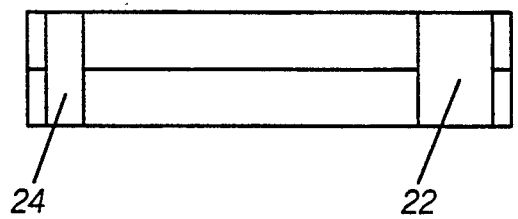
FIG. 7 is a front elevational view of a battery package in accordance with the invention.

Referring back to FIG. 1, it can be seen that the cover 34 can also take the form a label 46. This can be done by simply imprinting on the cover or making the cover a thin film. This now provides a triple functionality to the cover, that is, the cover serves as a label, it serves as a cover to environmentally protect the battery package 5, and it also serves as a method to unitize and rigidize the battery cells 10 within the package. A top view of one embodiment of the invention is shown in FIG. 6, where the label 46 is centrally located on the cover 34, and the cover 34 is bonded to portions of the housing 16. In FIG. 7, a typical configuration of positive terminal 22 and negative terminal 24 can be seen.

In summary, the battery package of the instant invention provides a battery package with minimum thickness at a low cost by using conventional, cylindrical battery cells in order to form a unitized battery package. The use of thermoplastic adhesives that can be deformed by ultrasonic welding provides integrity and additional structure to the battery package by bonding the cells to the housing in a highly-efficient and repeatable manner. The battery package of the instant invention provides a battery package of comparable size and energy density to one fabricated using prismatic or rectangular cells at substantially reduced cost.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

FIGURE REFERENCES

5—Battery package
10—Battery
12—conductor means
14—Power supply means
16—Housing
18—Top
20—Bottom
22—Positive terminal
24—Negative terminal
26—Terminal first portion
28—Terminal second portion
30—Aperture
32—Cylinder Wall
33—Exterior surface
34—Cover
36—Adhesive
40—Ultrasonic horn
42—First portion
44—Second portion
46—Label
48—Interior surface

What is claimed is:

1. An electrical energy source, comprising:
a housing having first and second parts;
power supply means, disposed in the housing, for providing electrical potential;
positive and negative terminals attached to the housing;
conductor means for connecting the power supply means to the positive and negative terminals;
one or more apertures in at least the first housing part, the apertures corresponding to the location of the power supply means; and
a non-conductive film having first and second opposing faces, the first face having first and second adhesive portions, the first adhesive portion bonded to the power supply means, and the second adhesive portion bonded to the housing; and
a cover bonded to a third adhesive portion on the second face of the non-conductive film.

2. The electrical energy source as described in claim 1, further comprising a second non-conductive film having first and second adhesive portions and first and second opposing faces, the first adhesive portion on the first face bonded to the power supply means, and the second adhesive portion bonded to the other part of the housing.

3. The electrical energy source as described in claim 2, further comprising a second cover bonded to a third adhesive portion on the second face of the second film.

4. A battery package, comprising:
a housing comprising a first part attached to a second part, each part having one or more apertures;
positive and negative terminals attached to the housing;
a plurality of battery cells electrically connected to each other and disposed in the housing, each cell located to correspond to an aperture, such that a portion of each cell is exposed in the aperture;
conductor means for connecting the plurality of battery cells to the positive and negative terminals;
a first cover attached to an exterior portion of the first housing part, a first portion of said cover adhesively bonded to said exposed portion of the battery cells and a second portion of said cover adhesively bonded to the first housing part; and
a second cover attached to an exterior portion of the second housing part, a first portion of said cover adhesively bonded to said exposed portion of the battery cells and a second portion of said cover adhesively bonded to the second housing part.

5. A battery package, comprising:
a plastic housing comprising a top attached to a bottom, each having one or more apertures;
a plurality of cylindrical-shaped batteries, each battery electrically connected to another and disposed in the housing so that the cylinder wall of the battery is co-located with an aperture in the top and the bottom and is substantially tangent to an exterior surface of the housing;
positive and negative terminals situated in the housing, a first portion of each terminal connected to the plurality of cylindrical-shaped batteries and a second portion providing an electrical connection on the exterior of the housing;
a first cover attached to an exterior portion of the top by means of an adhesive material, a first portion of said cover adhesively bonded with said material to said co-located battery cylinder walls and a second portion of said cover adhesively bonded with said material to the top; and
a second cover attached to an exterior portion of the bottom by means of an adhesive material, a first portion of said cover adhesively bonded to said co-located battery cylinder walls and a second portion adhesively bonded to the bottom.

6. The battery package as described in claim 5, wherein the adhesive material is a hot melt glue.

7. The battery package as described in claim 5, wherein the adhesive material is a pressure sensitive adhesive.

8. The battery package as described in claim 5, wherein the adhesive material is melted and deformed by application of ultrasonic energy and mechanical pressure to the cover.

9. The battery package as described in claim 5, wherein the adhesive material is of non-uniform thickness.

10. The battery package as described in claim 5, wherein the first cover is a label.

11. The battery package as described in claim 5, wherein the second cover is a label.

12. The battery package as described in claim 5, wherein the first and second covers are labels.

13. The battery package as described in claim 5, wherein the adhesive material is selected from the group consisting of unsupported adhesive film, single sided adhesive film, and double sided adhesive film.

14. The battery package as described in claim 5, wherein the adhesive material is a discontinuous adhesive film.

15. A battery package, comprising:
a housing comprising a first part attached to a second part, each part having one or more apertures;
positive and negative terminals attached to the housing;
a plurality of battery cells electrically connected to each other and disposed in the housing, each cell located to correspond to an aperture, such that a portion of each cell is exposed in the aperture;
conductor means for connecting the plurality of battery cells to the positive and negative terminals;

a first cover attached to an exterior portion of the first housing part by an adhesive material, a first portion of said first cover bonded to said exposed portion of the battery cells by locally deforming the adhesive material with heat and pressure, and a second portion of said cover bonded to said first housing part by locally deforming the adhesive material with heat and pressure; and a second cover attached to an exterior portion of the second housing part by an adhesive material, a first portion of said second cover bonded to said exposed portion of the battery cells by locally deforming the adhesive material with heat and pressure, and a second portion of said second cover adhesively bonded to the second housing part by locally deforming the adhesive material with heat and pressure.

* * * * *